United States Patent [19]

Brunnhofer

[11] Patent Number: 5,167,259
[45] Date of Patent: Dec. 1, 1992

[54] THREE-LAYER FUEL-LINE HOSE

[75] Inventor: Erwin Brunnhofer, Fuldabrück, Fed. Rep. of Germany

[73] Assignee: Technoform Caprano & Brunnhofer KG, Buldabruck, Fed. Rep. of Germany

[21] Appl. No.: 607,151

[22] Filed: Oct. 31, 1990

[30] Foreign Application Priority Data

Nov. 20, 1989 [DE] Fed. Rep. of Germany ....... 3938497
Jan. 17, 1990 [DE] Fed. Rep. of Germany ....... 4001126

[51] Int. Cl.$^5$ .................. F16L 11/00; F16L 11/04
[52] U.S. Cl. .................. 138/137; 138/103; 138/125; 138/126; 138/140
[58] Field of Search .......... 138/137, 124, 125, 126, 138/140, 141, 103; 285/149; 428/36.6

[56] References Cited

U.S. PATENT DOCUMENTS

| | | | |
|---|---|---|---|
| 2,053,112 | 9/1936 | Schnabel | 138/137 |
| 2,453,997 | 11/1984 | MacWilliam | 285/149 |
| 2,971,538 | 2/1961 | Brumbach | 138/137 |
| 3,561,493 | 2/1971 | Maillard | 138/141 |
| 3,584,656 | 6/1971 | Assendelet | 138/137 |
| 4,243,724 | 1/1981 | Strutzel et al. | 138/137 |
| 4,244,914 | 1/1981 | Ranalli et al. | 138/137 |
| 4,436,778 | 3/1984 | Dugal | 138/137 |
| 4,614,208 | 9/1986 | Skarelius | 138/137 |
| 4,644,977 | 2/1987 | Arterburn | 138/137 |
| 4,713,296 | 12/1987 | Aoyama et al. | 428/36.6 |
| 4,894,267 | 1/1990 | Bettle et al. | 428/36.6 |
| 4,977,004 | 12/1990 | Bettle et al. | 428/36.6 |
| 5,011,720 | 4/1991 | Iabarin | 428/36.6 |

FOREIGN PATENT DOCUMENTS 0030091 6/1981 European Pat. Off. ............ 138/137

Primary Examiner—James E. Bryant, III
Attorney, Agent, or Firm—Herbert Dubno

[57] ABSTRACT

A layered tubing for use in a motor vehicle has a thick tubular outer layer formed of a Nylon 11 or Nylon 12, a thin tubular inner solvent-blocking layer inside the outer layer and formed of a copolymer of ethylene and vinylalcohol, and a tubular intermediate layer between and bonded to the inner and outer layers and formed of polyethylene or polypropylene. The outer layer has a thickness of between 0.2 mm and 0.7 mm and the intermediate layer comprises by weight 30% to 45% polyethylene. The inner layer has a thickness of between 0.1 mm and 0.2 mm and the intermediate layer has a thickness of between 0.05 mm and 0.2 mm.

3 Claims, 1 Drawing Sheet

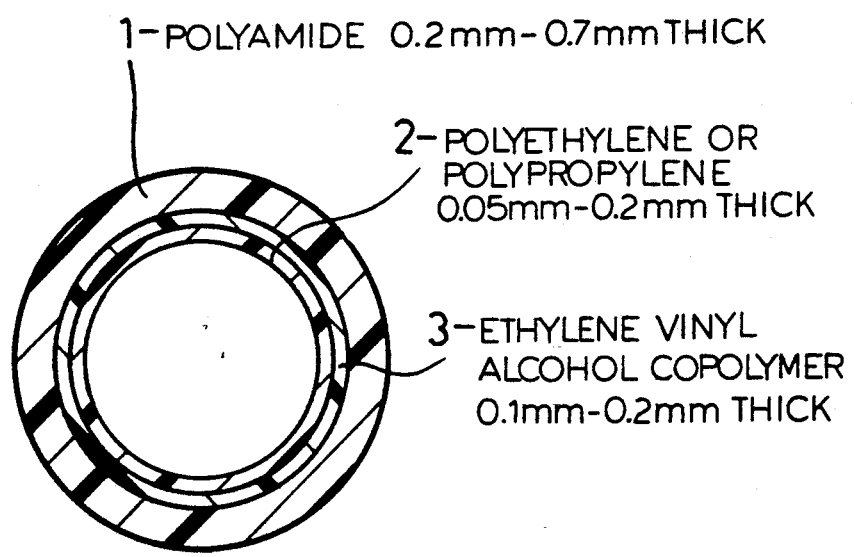

THREE-LAYER FUEL-LINE HOSE

FIELD OF THE INVENTION

The present invention relates to a hose for use in a motor vehicle. More particularly this invention concerns a layered hose usable as a fuel line in a motor vehicle.

BACKGROUND OF THE INVENTION

Tubing used in a motor vehicle is frequently exposed to alcohol. The motor-vehicle fuel itself frequently contains alcohol-type additives serving as dryers or can even be in large part formed by alcohol itself serving as fuel, the brake fluid includes alcohol to prevent any condensate in the brake lines from freezing up, and the fluid used in the windshield washer includes alcohol both to prevent freezing and act as a solvent. The instant invention is aimed at tubing serving all these and other purposes, both as original equipment or as replacement part.

The standard such tubing as described in German patent 3,821,723 filed Jun. 28, 1988 by E. Brunnhofer comprises three coextruded layers. The outer layer is relatively thick and is formed of polyamide, typically Nylon 12 which is a type of nylon made by the polymerization of lauric lactam (dodecanoic lactam) or cyclodedecalactam, with 11 methylene units between the linking —NH—CO— groups in the polymer chain. The mechanical properties of Nylon 12 are intermediate between those of conventional nylons and polyethylene, and it is the lowest in water absorption (1.5%) and specific gravity (1.01) of all the nylons (*Whittington's Dictionary of Plastics* by L. Whittington; Technomic 1968). The inner layer is much thinner and is formed of Nylon 6, Nylon 6.6, Nylon 11 which is a type of nylon derived from 11-aminoundecanoic acid, used for fibers and moldings (*Whittington's Dictionary of Plastics;* op. Cit.), or Nylon 12. The intermediate layer is made of a polyolefin and acts as a block to the perfusion of alcohol to the outer layer, so that the thick outer layer will impart dimensional stability to the hose.

Particular problems arise, however, when surface-active agents or oxygen-releasing substances pass through such a tubing. In fact cracks and oxidation of the tubing is possible. Furthermore the plastic of the tubing contains substances, monomers or oligomers, which are soluble in the fuel or other liquid in the tubing. Not only does this have a bad effect on the service life of the tubing, but when the vehicle equipped with such tubing is first filled with, for instance, gasoline and then allowed to stand a long time, for instance, for shipping overseas, the composition of the fuel or other liquid in the tubing changes as components of the tubing diffuse into the liquid in the tubing. Alcohol and aromatics in the fluid diffuse at different rates through the layered tubing wall from the aliphatic components. The resultant change in the composition of the liquid in the tubing changes the solubility thresholds of them so as, for example, to be able to crystalize monomers and oligomers of the Nylon 11 and Nylon 12 into the liquid. The presence of copper ions, which can be picked up from the fuel pump, accelerates this crystallization. The crystallized precipitate can block filters and collect to limit travel of the fuel-pump or carburetor float, and can plug jets or injectors as well as build up on critical control surfaces of the fuel pump.

OBJECTS OF THE INVENTION

It is therefore an object of the present invention to provide a improved multilayer tubing for use as a fuel line.

Another object is the provision of such an improved multilayer tubing for use as a fuel line which overcomes the above-given disadvantages, that is which does not let soluble substances from the resin forming the tubing precipitate in the liquid in the tubing.

SUMMARY OF THE INVENTION

A layered tubing for use in a motor vehicle according to the invention has a thick tubular outer layer formed of a polyamide, a thin tubular inner solvent-blocking layer inside the outer layer and formed of a copolymer of ethylene and vinylalcohol, and a tubular intermediate layer between and bonded to the inner and outer layers and formed of polyethylene or polypropylene.

The outer layer in accordance with the invention has a thickness of between 0.2 mm and 0.7 mm and the intermediate layer comprises by weight 30% to 45% polyethylene. The inner layer has a thickness of between 0.1 mm and 0.2 mm and the intermediate layer has a thickness of between 0.05 mm and 0.2 mm. In addition the outer layer is made of Nylon 11 or Nylon 12.

With this composition and dimensioning the outer layer effectively prevents the tubing from stretching. In addition the soluble substances of the resins making the tubing cannot go into solution into the fuel or like liquid inside the tubing. This is prevented in that the innermost layer which actually contacts the liquid in the tubing is formed of a special substance that has nothing that can solubilize in fuel or any other normally alcohol-containing motor-vehicle liquid.

BRIEF DESCRIPTION OF THE DRAWING

The above and other objects, features, and advantages will become more readily apparent from the following, reference being made to the accompanying drawing whose sole FIGURE is a cross section through a tube according to this invention with elements shown not to scale for clarity of view.

SPECIFIC DESCRIPTION

As seen in the drawing a tubing for use in a motor vehicle conveying an alcohol-containing liquid, for instance, fuel, comprises a thick outer layer 1, a thin inner layer 2, and a thin intermediate bonding layer 3.

The outer layer 1 is formed of a polyamide, Nylon 11 or Nylon 12. It is between 0.2 mm and 0.7 mm thick.

The inner layer 2 is a copolymer of ethylene and vinylalcohol with the ethylene making up 30% to 45% of its mass. It is between 0.1 mm and 0.2 mm thick.

The intermediate bonding layer 3 also serves as a blocking layer and has active side chains of maleic acid anhydride. It is between 0.05 mm and 0.2 mm thick.

I claim:

1. A fuel line for use in a motor vehicle, the fuel line comprising:
    a tubular outer layer formed of a polyamide between 0.2 mm and 0.7 mm thick;
    a tubular inner solvent-blocking layer inside the outer layer, formed of a copolymer of ethylene and vinylalcohol, and between 0.1 mm and 0.2 mm thick; and a tubular intermediate layer between and bonded to the inner and outer layers, formed of polyethylene or polypropylene, having side chains of maleic-acid anhydride, and between 0.05 mm and 0.2 mm thick.

2. The fuel line defined in claim defined in claim 1 wherein the inner solvent-blocking layer comprises by weight 30% to 45% polyethylene.

3. The fuel line defined in claim 1 wherein the outer layer is made of Nylon 11 or Nylon 12.

* * * * *